United States Patent
Rossberg et al.

(10) Patent No.: US 9,989,431 B2
(45) Date of Patent: Jun. 5, 2018

(54) MULTILEVEL PRESSURE SENSOR

(71) Applicant: Endress + Hauser GmbH + Co. KG, Maulburg (DE)

(72) Inventors: Andreas Rossberg, Bad Sackingen (DE); Olaf Textor, Lorrach (DE); Elmar Wosnitza, Freiburg (DE)

(73) Assignee: ENDRESS + HAUSER GMBH + CO. KG, Maulburg (DE)

( * ) Notice: Subject to any disclaimer, the term of this patent is extended or adjusted under 35 U.S.C. 154(b) by 65 days.

(21) Appl. No.: 15/103,107

(22) PCT Filed: Nov. 14, 2014

(86) PCT No.: PCT/EP2014/074581
§ 371 (c)(1),
(2) Date: Jun. 9, 2016

(87) PCT Pub. No.: WO2015/086254
PCT Pub. Date: Jun. 18, 2015

(65) Prior Publication Data
US 2016/0305836 A1  Oct. 20, 2016

(30) Foreign Application Priority Data

Dec. 11, 2013  (DE) .................. 10 2013 113 843

(51) Int. Cl.
*G01L 9/00* (2006.01)
(52) U.S. Cl.
CPC .......... *G01L 9/0072* (2013.01); *G01L 9/0051* (2013.01)
(58) Field of Classification Search
None
See application file for complete search history.

(56) References Cited

U.S. PATENT DOCUMENTS 5,585,311 A  12/1996  Ko
6,041,659 A  3/2000  Wilda
(Continued)

FOREIGN PATENT DOCUMENTS

DE  102007012060 A1  9/2008
DE  102008042447 A1  4/2010
(Continued)

OTHER PUBLICATIONS

German Search Report, German Patent Office, Munich, DE, dated Jan. 7, 2014.
(Continued)

*Primary Examiner* — Andre Allen
(74) *Attorney, Agent, or Firm* — Bacon & Thomas, PLLC

(57) ABSTRACT

A pressure sensor comprises a deformable measuring diaphragm, and a mating body connected in a pressure-tight manner and forms a measuring chamber in which a reference pressure is present. A pressure can be applied to an outside of the measuring diaphragm. The pressure sensor has a capacitive transducer having at least one mating body electrode and at least one diaphragm electrode. Above a pressure limit value for the pressure, at least one central surface section of the measuring diaphragm rests against the mating body with a contact surface area, the size of which is dependent on the pressure. The pressure sensor also has a resistive transducer for converting a pressure-dependent deformation of the measuring diaphragm, when pressed in a range of values above the pressure limit value, into an electrical signal using an electrical resistance which is dependent on the contact surface area of the measuring diaphragm on the mating body.

12 Claims, 2 Drawing Sheets

(56) References Cited

U.S. PATENT DOCUMENTS

| | | | |
|---|---|---|---|
| 7,549,343 B2 | 6/2009 | Bekker | |
| 2012/0024075 A1 | 2/2012 | Peng | |
| 2016/0025582 A1* | 1/2016 | Fehrenbach | G01L 9/125 73/724 |
| 2016/0131546 A1* | 5/2016 | Ponath | G01L 9/0075 73/718 |
| 2016/0305836 A1 | 10/2016 | Rossberg | |
| 2016/0320256 A1* | 11/2016 | Burgard | G01L 9/0072 |
| 2017/0167936 A1* | 6/2017 | Jochem | G01L 19/0618 |

FOREIGN PATENT DOCUMENTS

| | | |
|---|---|---|
| DE | 102010043043 A1 | 5/2012 |
| WO | 2008151972 A2 | 12/2008 |
| WO | 2015086254 A1 | 6/2015 |

OTHER PUBLICATIONS

International Search Report, EPO, The Netherlands, dated Jan. 26, 2015.
English Translation of the International Preliminary Report on Patentability, WIPO, Geneva, CH, dated Jun. 23, 2016.

\* cited by examiner

MULTILEVEL PRESSURE SENSOR

TECHNICAL FIELD

The present invention concerns a pressure sensor—in particular, a multilevel pressure sensor.

BACKGROUND DISCUSSION

Capacitive pressure sensors usually comprise a measuring diaphragm and a mating body, wherein the measuring diaphragm is connected to the mating body in a pressure-tight manner along a circumferential edge. A measuring chamber is formed between the mating body and the measuring diaphragm in which a reference pressure is present, and a pressure to be measured can be applied to an outside of the measuring diaphragm facing away from the measuring chamber. The measuring diaphragm can be deformed on the basis of the pressure, wherein the pressure sensor has a capacitive transducer having at least one mating body electrode and at least one diaphragm electrode. The capacity between the mating body electrode and the diaphragm electrode depends on the pressure-dependent deformation of the measuring diaphragm, and a central surface section of the measuring diaphragm in case of overload rests against the mating body with a resting surface area, the size of which is dependent on the pressure.

Due to its resting on the mating body, the measuring diaphragm is supported by an additional overload pressure range, which prevents the measuring diaphragm from reaching fracture stress. On the one hand, this protects the sensor against destruction, but on the other hand, a capacitive pressure measurement in a high pressure range is thus rendered impossible.

In order to enable this nonetheless, there is an option of increasing the distance between the measuring diaphragm and the mating body, which makes the measuring diaphragm rest on the mating body only when the pressure is higher. However, this is a disadvantage for two reasons. Firstly, with the increasing distance between the electrodes, the dC/dp dynamics decrease, and secondly, reaching fracture stress, and thus destroying the pressure sensor, becomes more likely. On the other hand, stiffer measuring diaphragms may be used, which in turn leads to loss of dC/dp dynamics.

However, measuring tasks are known in which low pressures must be measured with high precision during a vacuum process, wherein the prevailing steam pressure is to be captured in subsequent saturated steam sterilizations of the process plant. The latter may, if necessary, be completed with a lower measuring precision.

SUMMARY OF THE INVENTION

The object of this invention is therefore to remedy the noted disadvantage.

The object is achieved according to the invention by the pressure sensor which comprises a measuring diaphragm and a mating body, wherein the measuring diaphragm is connected to the mating body in a pressure-tight manner along a circumferential edge, wherein a measuring chamber is formed between the mating body and the measuring diaphragm in which a reference pressure is present. A pressure to be measured can be applied to an outside of the measuring diaphragm facing away from the measuring chamber, wherein the measuring diaphragm can be deformed on the basis of the pressure. The pressure sensor has a capacitive transducer having at least one mating body electrode and at least one diaphragm electrode, wherein the capacity between the mating body electrode and the diaphragm electrode depends on the pressure-dependent deformation of the measuring diaphragm, wherein, above a pressure limit value for the pressure, at least a central surface section of the measuring electrode rests against the mating body with a contact surface area, the size of which is dependent on the pressure, and wherein the pressure sensor furthermore has a resistive transducer to modify a pressure-dependent deformation of the measuring diaphragm into an electrical signal above the pressure limit value based on an electrical resistor that depends on the contact surface area of the measuring diaphragm on the mating body.

The reference value in absolute pressure sensors may be a vacuum pressure of, for example, less than $10^{-3}$ hPa ($10^{-3}$ mbar) and/or the surrounding atmospheric pressure in case of a relative pressure sensor.

In one further development of the invention, the resistive transducer has at least two electrodes, wherein the electrical resistor on the basis of which the resistive transducer provides the electrical signal must be determined between the at least two electrodes.

In one further development of the invention, the resistive transducer has at least one resistor layer in which at least one of the electrodes of the resistive transducer is coated, wherein the resistor layer of a first electrode of the resistive transducer has a contact surface area to a second electrode and/or to a resistor layer of the second electrode depending on the resting surface area of the measuring diaphragm on the mating body at pressures above the pressure limit value.

In one further development of the invention, the contact surface area is mainly equal to the resting surface area.

In one further development of the invention, the diaphragm electrode of the capacitive transducer forms a first electrode of the resistive transducer, and the mating body electrode of the capacitive transducer forms a second electrode of the resistive transducer.

In one further development of the invention, the capacitive transducer comprises at least two mating body electrodes, with the first of the mating body electrodes being arranged in a first radial area, and the second of the mating body electrodes being arranged in a second radial area, with the first radial area comprising smaller radii than the second radial area, with the resting surface area being formed only in the first radial area for a first pressure range above the pressure limit value, and with the resistive transducer being designed to provide a signal that depends on the resistance between the first mating body electrode and the diaphragm electrode.

According to one embodiment of the invention, the two mating body electrodes may be wired as a differential capacitor, with the capacities compared to the diaphragm electrode in rest position of the measuring diaphragm being equal. A frequently used transfer function for those differential capacitors has the form, $p = p((cp - cr)/cr)$.

In one further development of the invention, the pressure sensor further comprises an evaluation circuit that is designed to provide a pressure measuring value dependent on the capacity for pressures below the pressure limit value, with the signal of the resistive transducer becoming part of the determination of the pressure measuring value in a value range above the pressure limit value.

In one further development of the invention, the evaluation circuit is designed to determine a pressure measuring value dependent on a capacity between a diaphragm electrode and the second mating body electrode for at least a partial section of the first pressure range that directly follows the pressure limit value.

In one further development of the invention, the evaluation circuit is designed to determine a pressure measuring value depending on the signal from the resistive transducer when the resistance falls below a resistance limit value.

In one further development of the invention, a pressure measuring value of the capacity between the diaphragm electrode and the second mating body electrode is also determined in a second pressure range that follows the first pressure range towards a lower pressure range, with the second pressure range having a lower threshold that may, for example, be no less than 75% —preferably, no less than 90% —of the pressure limit value.

The determination of the pressure in the second area below the pressure limit value exclusively on the basis of the capacity of the outer mating electrode allows steady pressure measuring in a range in which the capacity of the inner mating body electrode diverges with increasing pressure, thus complicating a reliable transformation into a capacitive-dependent signal. Similarly, the contact surface area is still so small at pressures just above the pressure limit value that the signal from the resistive transducer also experiences strong fluctuations. The capacity of the outer electrode here offers an opportunity for providing a steady signal that is well suited to cover the critical transition range around the pressure limit value, although the dcr/dp dynamics of the capacity of the outer mating body electrode are naturally limited.

In one further development of the invention, the resistance layer comprises SiC or $TiO_2$.

In one further development of the invention, the measuring diaphragm and the mating body include a ceramic material, especially corundum, with the electrodes of the capacitive transducer comprising metal.

In one further development of the invention, the measuring diaphragm features a semiconductor—in particular, silicon.

BRIEF DESCRIPTION OF THE DRAWINGS

The invention is explained in further detail below on the basis of an exemplary embodiment shown in the drawings. They show.

DETAILED DISCUSSION IN CONJUNCTION WITH THE DRAWINGS

Figure 1:
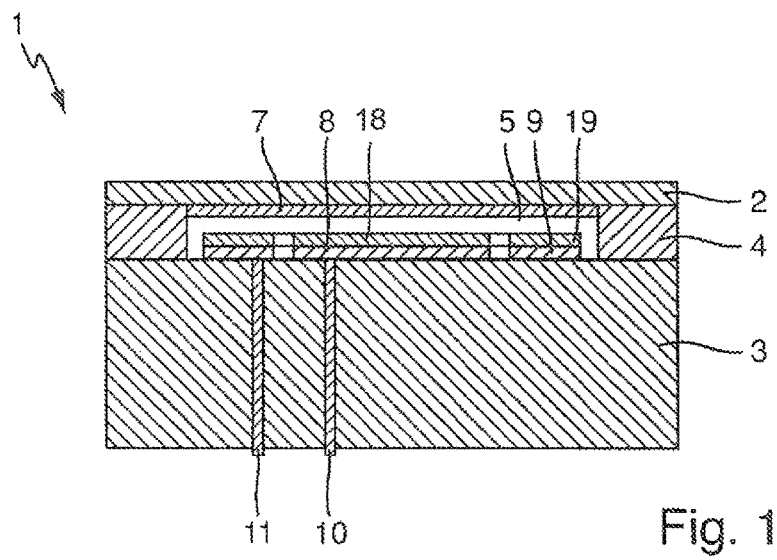
FIG. 1: is a schematic longitudinal view through an example embodiment of a pressure sensor according to the invention.

The pressure sensor 1 shown in FIG. 1 comprises a disk-shaped, ceramic measuring diaphragm 2 that is in a pressure-tight connection along a circumferential joint 4 with a much stiffer disk-shaped ceramic mating body 3, thus creating a measuring chamber 5 between the mating body 3 and the measuring diaphragm 2. The measuring diaphragm and the mating body may, in particular, comprise corundum. The joint may, in particular, comprise an active hard solder—for example, a Zr—Ni—Ti active hard solder or glass.

The measuring diaphragm has a diaphragm electrode 7 across its entire mating body surface that, for example, includes a metal layer, especially a Ta layer, wherein the electrode has a diameter of 2 R, with R being the radius of the flexible area of the measuring diaphragm that corresponds to the internal radius of the joint. On the surface of the mating body on the side of the measuring diaphragm, a central, disk-shaped measuring electrode 8 is arranged that is surrounded by a disk-shaped reference electrode 9 which is mainly of the same capacity as the diaphragm electrode 7 in rest position of the measuring diaphragm 2. The distance of the reference electrode 9 to the measuring electrode 8 and the joint 4 is about 0.1 R each. The reference electrode 9 and the measuring electrode 8 are in electrical contact via metallic transits 10, 11 through the base body. The diaphragm electrode 7 may, for example, be placed on switching ground via the joint 4.

The measuring electrode 8 is covered with an electrical resistance layer 18 that is, for example, SiC with a thickness of, for example, 10-100 μm. The specific resistance of the layer is, for example, approximately 1 kΩ·m to 10 kΩ·m.

In another embodiment of the invention, the resistance layer comprises $TiO_2$ tandioxyde or doped $TiO_2$, with the $TiO_2$ adjoining the joint featuring a solder resist preparation that prevents any hard solder from flowing into the measuring chamber 5 during the connection of the measuring diaphragm with the base body. Since a galvanic contact is established between the joining point and the solder resist, the solder resist must be insulated against the outer mating body electrode. For this purpose, the simplest manner is to apply the resistance layer onto the diaphragm electrode. If a $TiO_2$ resistance layer with solder resist function is to be prepared on the mating body, it must be structured accordingly, so that the mating body electrodes and the joining point are insulated against each other.

When the measuring diaphragm 2 is deflected above the pressure limit value to such a degree that its center rests on the mating body 3, there is an electrical contact between the diaphragm electrode 7 and the measuring electrode 8, and/or at even higher pressure and a sufficiently small balance distance between measuring diaphragm and mating body—possibly also between the diaphragm electrode 7 and the reference electrode 9. Due to the resistance layers 18, 19 on the electrodes, there is, however, no short circuit, but a defined resistance whose value decreases with increasing contact surface area. The resistance here is, for example, to be captured between the switching ground on which the diaphragm electrode 7 rests and the transits 10 and/or 11 of the measuring electrode 8 and/or the reference electrode 9. In the example embodiment shown, the diaphragm electrode 7 rests on switching ground above the electrically conductive joining point 4 which comprises and active hard solder. If the measuring diaphragm should be formed with the mating body by means of a glass solder, the diaphragm electrode may, for example, be contacted with an electrical transition (not shown here) through the mating body and the joining point.

Figure 2:
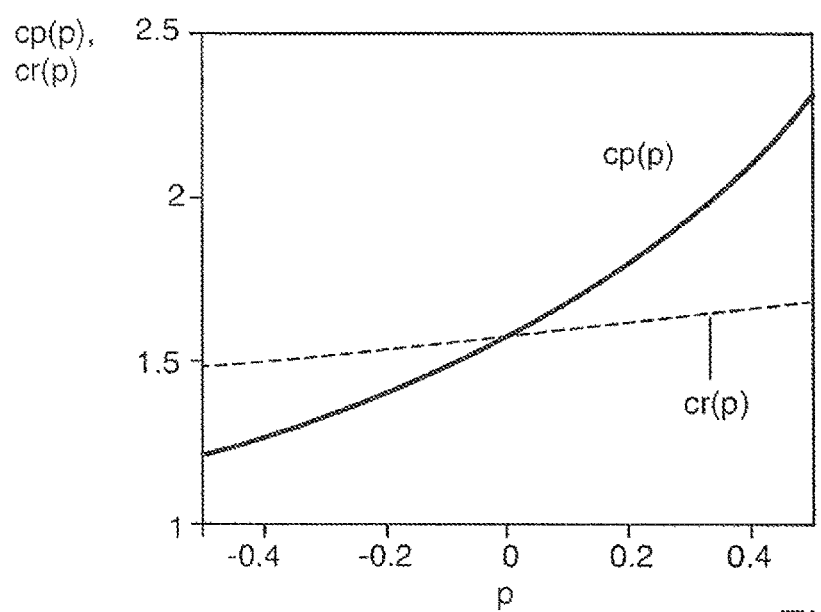
FIG. 2: is a diagram of the capacities of an example embodiment of a capacitive pressure sensor with a differential capacitor in a pressure range to be evaluated in a purely capacitive manner.
Figure 3:
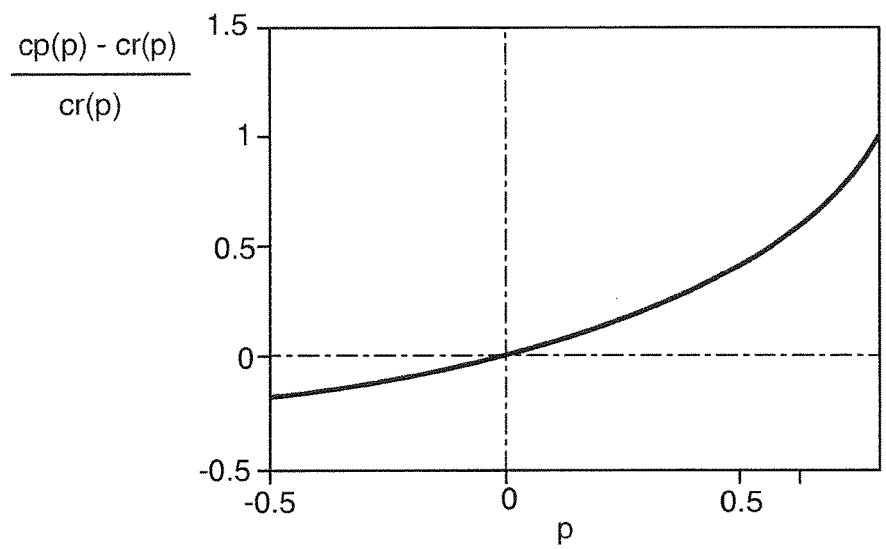
FIG. 3: is a diagram of a transfer function that is to be determined from the capacities of the differential capacitor in FIG. 2.
Figure 4:
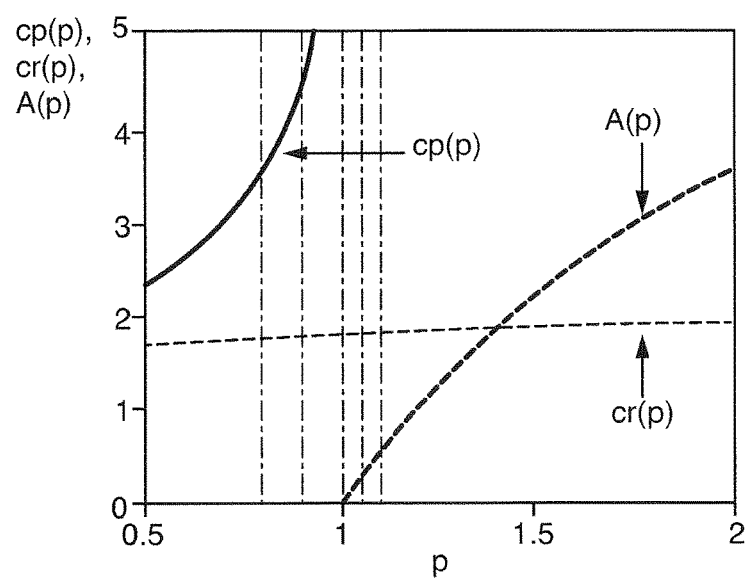
FIG. 4: is a representation of the capacities of the differential capacitor and the contact surface area between the inner electrode of the differential capacitor and the diaphragm electrode in a pressure range around the pressure limit value.

As shown in FIG. 2, the capacities of the differential capacitors described above mainly follow the following pressure-dependent course. In rest position of the measuring diaphragm that occurs at a pressure p=0, the measuring electrode capacity is equal to the reference electrode capacity. With increasing pressure, the measuring electrode capacity cp, indicated by a continuous line, increases more than the reference electrode capacity cr, indicated by a dotted line. FIG. 3 in turn shows a typical transfer function (cp−cr)/cr on the basis of the capacities shown in FIG. 2, wherein the capacitive transducer emits a signal that is a function of the transfer function. The usual range of application for such a transfer function extends, for example, across a pressure range of p=−0.3 to p=0.3 and/or p=−0.5 to p=0.5, with p=1 being the pressure at which the center of the measuring diaphragm contacts the mating body. As shown in FIG. 2, the measuring electrode capacity cp for p>0.5 increases sharply, leading to, for example, the necessity of using a relatively large range of values of an AD transducer for a small pressure range, which is also frequently found in the peripheral areas of the measuring range that is of most interest. If the pressure continues to approach p=1, the measuring electrode capacity theoretically approaches the infinite, thus rendering it and/or the transfer function derived from it no longer adequate to determine a pressure measuring value. For a better description of this problem, FIG. 4 once more illustrates the measuring electrode capacity cp (with a continuous line) and the reference electrode capacity cr (with a dotted line) for a pressure range between p=0.5 and p=2. It also shows the contact surface area between the measuring electrode and the diaphragm electrode (with a dashed line). For p>0.8 and/or 0.9, the measuring electrode capacity increases to such an extent that any evaluation of a respective signal can only be done with great effort. The measuring electrode capacity, furthermore, breaks down at p=1, since the electrodes involved come into contact. On the other hand, the contact surface area to be captured by the resistive transducer is still very small at p=1, so that relatively small pressure fluctuations may lead to an unstable resistance signal. The resistive transducer capturing the resistance may therefore only be used for a reliable determination of the contact surface area and/or the pressure from p>1.05 and/or p>1.1. For the pressure range transition range around p=1—e.g., 0.9<p<1.05 and/or 0.8<p<1.1—it seems appropriate to determine the pressure on the basis of the reference electrode capacity, which indeed only shows minimal dynamics of dc/dp>0 in this transition range, but has a stable and steady course in contrast to the values described above on the basis of which a pressure measurement in the transition area may be conducted and/or supported.

The invention claimed is:

1. A pressure sensor, comprising:
a measuring diaphragm;
a mating body, said measuring diaphragm is in pressure-tight connection with said mating body along a circumferential edge;
a measuring chamber formed between said mating body and said pressure diaphragm in which a reference value is applied;
a capacitive transducer with at least one mating body electrode and at least one diaphragm electrode; and
a resistive transducer, wherein:
a pressure to be measured is applied to the outside of said measuring diaphragm facing away from said measuring chamber;
said measuring diaphragm is deformable on the basis of the pressure;
the capacity between said at least one mating body electrode and said at least one diaphragm electrode depends on the pressure-dependent deformation of said measuring diaphragm;
at least a central surface section of said measuring diaphragm rests on said mating body with a resting surface area whose size depends on the pressure above a pressure limit value for the pressure; and
said resistive transducer converts a pressure-dependent deformation of said measuring diaphragm at pressures in a value range above a pressure limit value into an electrical signal based on an electrical resistance that is dependent on said resting surface area of said measuring diaphragm on said mating body.

2. The pressure sensor according to claim 1, wherein:
said resistive transducer has at least two electrodes, with the electrical resistor on the basis of which said resistive transducer provides the electrical signal must be determined between the at least two electrodes.

3. The pressure sensor according to claim 2, wherein:
said resistive transducer has at least one resistor layer in which at least one of said electrodes of said resistive transducer is coated;
the resistor layer of a first electrode of said resistive transducer has a contact surface area to a second electrode and/or to a resistor layer of said second electrode depending on the resting surface area of said measuring diaphragm on said mating body at pressures above the pressure limit value.

4. The pressure sensor according to claim 3, wherein:
the contact surface area being essentially equal to the resting surface area.

5. The pressure sensor according to claim 3, wherein:
said resistance layer comprises SiC or TiO2.

6. The pressure sensor according to claim 2, wherein:
said diaphragm electrode of said capacitive transducer forms a first electrode of said resistive transducer; and
said at least one mating body electrode of said capacitive transducer forms a second electrode of the resistive transducer.

7. The pressure sensor according to claim 1, wherein:
said capacitive transducer comprises at least two mating body electrodes, with the first of the mating body electrodes being arranged in a first radial area, and the second of the mating body electrodes being arranged in a second radial area, with the first radial area comprising smaller radii than the second radial area, with the resting surface area being formed only in the first radial area for a first pressure range above the pressure limit value, with the resistive transducer being designed to provide a signal that depends on the resistance between said first mating body electrode and said diaphragm electrode.

8. The pressure sensor according to claim 7, wherein:
said evaluation circuit is designed to determine a pressure measuring value dependent on a capacity between a diaphragm electrode and the second mating body electrode in at least a partial section of said first pressure range that directly follows the pressure limit value.

9. The pressure sensor according to claim 1, furthermore comprising:
an evaluation circuit that is designed to provide a pressure measuring value dependent on the capacity for pressures below the pressure limit value, with the signal of said resistive transducer becoming part of the determination of the pressure measuring value above the pressure limit value.

10. The pressure sensor according to claim 9, wherein:
said evaluation circuit is designed to determine a pressure measuring value depending on the signal from said resistive transducer when the resistance falls below a resistance limit value.

11. The pressure sensor according to claim 1, wherein:
said measuring diaphragm and said mating body include a ceramic material—in particular, corundum—with the electrodes of the capacitive transducer comprising metal.

12. The pressure sensor according to claim 1, wherein:
said measuring diaphragm comprises a semiconductor—in particular, silicon.

\* \* \* \* \*